March 14, 1950  M. E. DUNKLEY  2,500,670
PROCESS OF TREATING FRUIT JUICE
Filed March 26, 1948
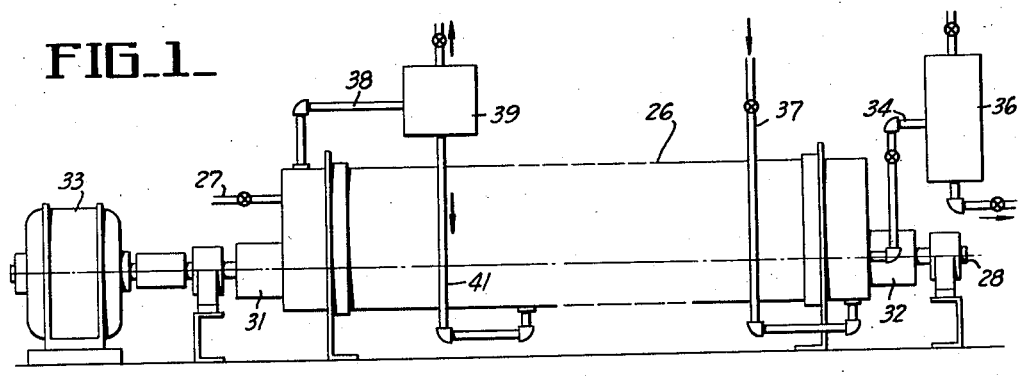
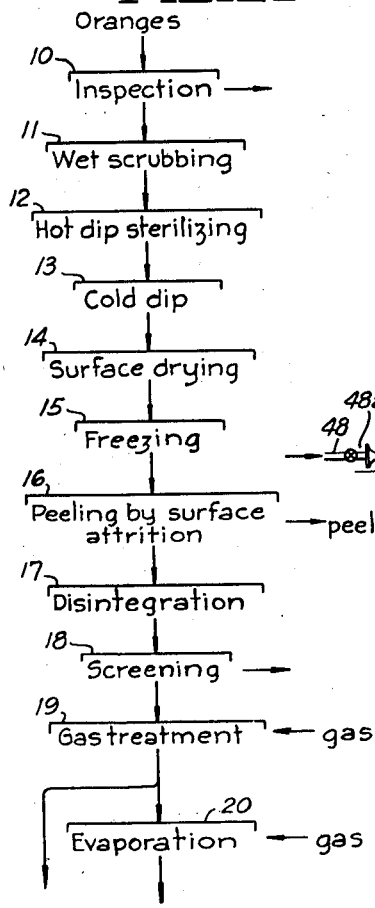
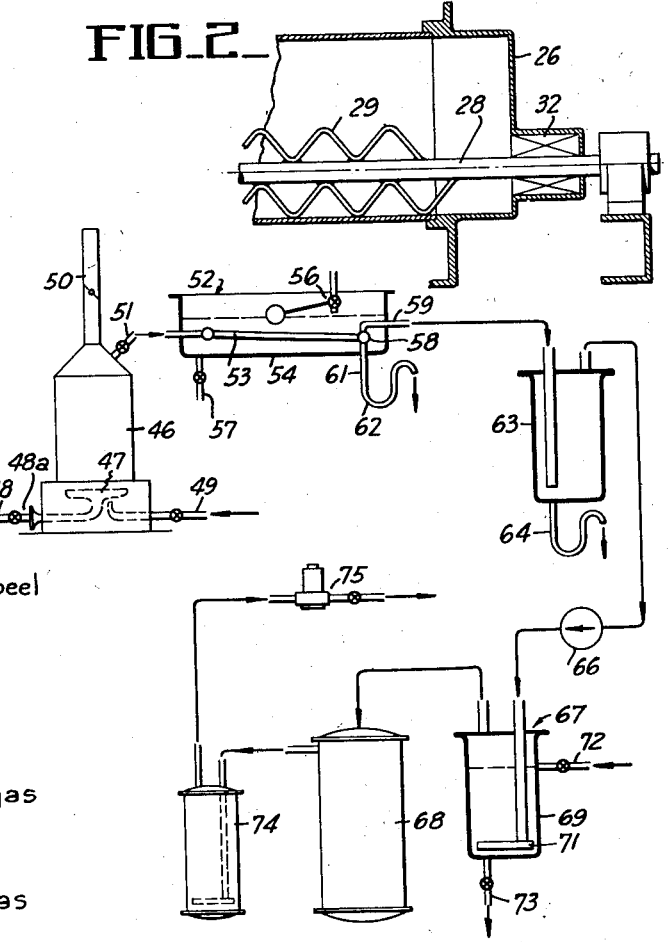
INVENTOR
Melville E. Dunkley
BY
ATTORNEYS Patented Mar. 14, 1950

2,500,670

UNITED STATES PATENT OFFICE 2,500,670

PROCESS OF TREATING FRUIT JUICE

Melville E. Dunkley, Modesto, Calif.

Application March 26, 1948, Serial No. 17,244

4 Claims. (Cl. 99—155)

This invention relates generally to processes for the treatment of fruit juices, particularly juices from citrus fruits such as oranges, lemons, grapefruit and the like. The present application is a continuation-in-part of my co-pending applications Serial Nos. 437,661 filed April 4, 1942 now Patent 2,440,676, 515,663 filed December 27, 1943 now abandoned, and 557,956 filed October 10, 1944 now Patent 2,436,363.

It is an object of the present invention to provide a process of the above character which will serve to preserve fruit juices against spoilage without impairment of desirable flavor and nutritive values.

A further object of the invention is to provide a process of the above character having provision for removing dissolved oxygen from the juice, while at the same time effecting intimate contact of the juice with a special treatment gas.

Another object of the invention is to provide a process particularly well adapted for the production of high quality citrus juice concentrate.

Another object of the invention is to provide a process capable of producing a citrus juice from navel oranges which will develop a pleasing (non-bitter) taste in the product, as distinguished from the decidedly bitter taste of fresh navel orange juice or concentrate therefrom, and as distinguished from the bitter taste which characterizes navel orange juice processed by prior methods.

Another object of the invention is to provide novel apparatus suitable for the treatment of fruit juices with a special gas.

Further objects of the invention will appear from the following description in which the preferred embodiments have been set forth in detail in conjunction with the accompanying drawing.

Referring to the drawing:

Figure 1 is a side elevational view of apparatus incorporating the present invention and capable of use in the present process.

Figure 2 is a detail in section showing a portion of the apparatus shown in Figure 1.

Figure 3 is a flow sheet illustrating a complete process for the treatment of citrus fruit as disclosed in my co-pending application Serial No. 437,661, filed April 4, 1942 now Patent 2,440,676.

Figure 4 is a diagrammatic view of apparatus suitable for use in producing my special treatment gas.

Referring first to the flow sheet of Figure 3, it illustrates a complete process in which fresh fruit, such as oranges, are first subjected to inspection 10 where defective or spoiled fruit is removed. It is then subjected to wet scrubbing 11, for the purpose of removing all foreign matter from the outer surface. The scrubbed or cleaned fruit is then subjected to sterilizing 12, as by immersion in a hot sterilizing solution. Following sterilization the fruit is passed to the cold dip operation 13, where it is immersed in relatively cool sterile water. The fruit then passes to the drying operation 14 to remove surface moisture, after which is passes to the freezing operation 15. Freezing is carried out so that at least the peel is frozen, together with a part of the fruit flesh near the peel.

Following freezing the fruit is passed to the peeling operation 16 where the frozen peel is removed by attrition. This operation results in formation of a peel slurry which can be removed at this point and used to make various by-products. The fruit flesh passes to the disintegrating operation 17, where it is reduced to a divided mass. This is then subjected to a screening operation 18 for removing the coarser pulp from the juice. The juice is now in condition for further treatment to form a preserved product. Operations 16 and 17 are preferably carried out in an atmosphere of a special treatment gas as hereinafter described.

After being freed from the coarser pulp the juice is subjected to a special treatment operation 19, during which it is intimately contacted with the above mentioned special treatment gas, and at the same time dissolved oxygen is removed. The treated juice can then be removed for storage without concentration, or it may be subjected to an evaporating operation 20 to produce a fruit juice concentrate. During evaporation the juice may again be enveloped in an atmosphere of my special gas.

It will be evident that the procedure outlined in Figure 3 can be simplified by the use of conventional methods for removal of the juice. Thus after inspection and surface cleaning the fruit can be passed to conventional juicing apparatus for removing the fruit juice, after which the coarser pulp can be removed by screening.

The special equipment illustrated in Figures 1 and 2 is well adapted for carrying out the gas treatment operation 19. This equipment consists of an extended cylindrical shaped housing 26 which has its left hand inlet end connected to juice pipe 27, through which the juice to be treated is introduced. Extending through the lower part of the chamber 26 there is a rotating shaft 28 which carries the beaters 29. The ends of shaft 28 extend through packing glands 31 and 32 in the end walls of the chamber 26, and an extension of this shaft can be directly coupled to driving motor 33. A relatively high rate of driving speed is required, as for example of the order of 1500 R. P. M. or more. A pipe 34 connecting with the right hand end of chamber 26 serves to remove the treated juice. This pipe can be connected to a gas trap 36 to remove any entrained gas. Pipe 37 connects with chamber 26 and serves to introduce the special treatment gas. Pipe 38 serves to continuously vent gas from the chamber, and this pipe is shown connecting to the trap 39 whereby any entrained juice is removed and caused to return to the treatment chamber through the pipe 41.

Assuming continuous introduction of a small amount of juice through pipe 27 into the chamber 26, continual bleeding in of special treatment gas through the pipe 37, and continual removal of juice through pipe 34, a substantial volume of juice is maintained within the treatment chamber 26, and this juice is violently agitated to form virtually a homogeneous mass comprising a mixture of liquid and gaseous phases, thereby insuring intimate commingling contact between the juice and the gas. As will be presently explained in greater detail the result of this treatment is to insure the desired preserving effect upon the juice, and in addition dissolved oxygen contained in the juice is effectively removed by dispersion.

The special gas which I prefer to employ is of the type disclosed in my said co-pending application Serial No. 515,663, filed December 27, 1943, now abandoned. Such a special gas is produced by controlled burning of a suitable fuel such as natural gas, by controlling the amount of combustion supporting oxygen or air employed whereby it is deficient compared to the amount required for complete combustion. Suitable equipment for the preparation of such a gas is shown in Figure 4. Briefly it consists of a furnace chamber 46 which has its lower portion provided with a suitable gas burner 47. Gas supply pipe 48 connects to the burner 47 and is provided with a conventional adjustable valve 48a for admitting a controlled amount of air to be intermixed with the gas. There is also a supplemental valve controlled pipe 49 which connects to the atmosphere and which serves to admit a controlled amount of secondary combustion supporting air into a region below the burner. The upper end of furnace 46 is shown connected to the draft stack or flue 50 and in addition a pipe 51 is provided for withdrawing a required amount of the gaseous products of combustion. The amount of combustion supporting air is controlled so that the gaseous products of combustion formed in chamber 46 contain only traces of remaining oxygen, preferably less than 0.50%, and so that the carbon monoxide content of the products of combustion is of the order of from 0.5 to 40%, depending upon the control employed and the type of fuel being utilized, a suitable range with natural fuel gas being from 1.5 to 6%.

Other types of generating equipment can be used if desired, such as a gas producer of the "Kemp" type, provided the oxygen supply is controlled as previously described.

Pipe 51 connects with a suitable cooling apparatus 52 which can consist of pipes 53 which receive gas from pipe 51 and which are immersed within a body of cooling water maintained in tank 54. Cooling water is shown being supplied to this tank through the flow control valve 56 and is shown being withdrawn through pipe 57. A header pipe 58 connects with the cooling pipe 53 and in turn delivers the gas to pipe 59 leading from the cooling equipment. In addition header pipe 58 is shown connected to depending pipe 61 which terminates in a U trap 62. Pipe 61 together with trap 62 serves the purpose of removing water condensing in the pipes 53, the watery vapor being a by-product of the combustion in furnace chamber 46.

Pipe 59 is shown delivering the gas to a suitable separator 63, the lower end of which is also connected to a drainage trap 64. The separator serves to remove remaining droplets of water which may be entrained with the gas. The gas is pumped from separator 63 by compressor 66 which delivers the gas to the washer 67 and storage tank 68. The washer 67 can consist of a simple tank 69 provided with a perforated header 71 connected to the discharge side of compressor 66. Inlet and outlet pipes 72 and 73 are shown for the purpose of maintaining a body of washing liquid in tank 69, as for example cooled deaerated water. Within tank 68 the gas is stored at a suitable pressure such as from 15 to 160 pounds per square inch. As the gas is required it is withdrawn through the filter 74, and the pressure reducing regulator 75 which supplies the gas at a substantially constant desired pressure. Filter 74 can make use of a suitable filtering medium such as activated charcoal, and serves to remove possible objectionable odors present in the gas.

The natural gas fuel which I have employed analyzes substantially as follows:

| | Per cent |
|---|---|
| Methane $CH_4$ | 87 |
| Ethane $C_2H_6$ | 8 |
| Propane $C_3H_3$ | 4 |
| Butane $C_4H_{10}$ | 1 |

In a typical instance properly controlled combustion as described above produces a satisfactory gas analyzing as follows:

| | Per cent |
|---|---|
| Carbon dioxide $CO_2$ | 8.2 |
| Acetylene $C_2H_2$ | 0.1–0.2 |
| Oxygen $O_2$ | 0.2–0.1 |
| Carbon Monoxide $CO$ | 3.8 |
| Methane $CH_4$ | 2.2 |
| Nitrogen $N_2$ | 85.5 |

While the effectiveness and peculiar properties of the above gas may be due to small amounts of gases not shown by the above analysis, according to my observations the effectiveness is due primarily to the presence of carbon monoxide and acetylene.

The special gas produced as described above is sterile, and its contact with the citrus juice produces certain novel effects. It has a remarkable preservative effect upon the juice. The vitamin content of the treated juice is relatively high after processing and tends to remain relatively high compared to the rapid deterioration experienced after other processes. The full natural flavor of the juice is effectively retained. A particularly novel effect has been noted in the treatment of juice from navel oranges, in that this juice after storage for a period of about a month or more develops a flavor which is free of bitterness, thus adding to its palatability. Juice of navel oranges preserved by other processes has a relatively bitter taste, which tends to become more bitter with storage.

Citrus and other fruit juices contain certain enzymes which play an important part in oxidation such as results in impairment of quality and spoilage. These enzymes are complex organic catalysts, which play an important part in oxidation and respiration processes. In general they can be termed metabolites and are found in carbohydrates, proteins, and like substances. The enzymes or catalysts which must be present in active state for such oxidation to proceed are generally metallo-porphyrin compounds, metallo-thianin compounds, or metallo-bio-catalysts. Probably many of such catalysts are complex compounds of the heavy metals, principally iron and copper.

My special gas produced by the equipment and method described above, has a remarkable effect in poisoning or immunizing bio-catalysts of the type mentioned, thus effectively inhibiting oxidation of carbohydrates, proteins and the like. The reactions involved are undoubtedly complex and cannot be outlined in detail. A significant fact with respect to inhibiting properties of the gases is that although the initial action of the gas in inhibiting enzymes appears comparatively rapid, and is capable of penetrating into a liquid mass, reconversion of the enzymes from inhibited to a non-inhibited state, after such treatment, occurs relatively slowly, and can be prevented entirely where the juice is placed in hermetically sealed containers, such as tin cans. Thus sterile fruit juice concentrates produced according to my process can be placed in sterile sealed containers and kept indefinitely.

My process is a substantial improvement over prior processes for the production of preserved fruit juices. Prior processes have produced products which are unsatisfactory as to flavor, and seriously impaired with respect to vitamin and other nutritive values. In contrast my process produces products of high palatibility and flavor quality, and relatively high in nutritive values.

I claim:

1. A process for the manufacture of preserved orange juice concentrate from navel oranges comprising intermixing and intimate contacting of the fresh juice with a gas analyzing substantially 8.2% carbon dioxide $CO_2$, 0.1–0.2% acetylene $C_2H_2$, 0.2–0.1% oxygen $O_2$, 3.8% carbon monoxide CO, 2.2% methane $CH_4$ and 85.5% nitrogen $N_2$, and then concentrating the juice by evaporation.

2. A process as in claim 1 in which evaporation is carried out while the juice is in contact with said gas.

3. In a process for the treatment of fruit juice, characterized by the use of a closed treatment chamber, supplying the juice to the treatment chamber, supplying a gas to the chamber substantially devoid of free oxygen and having the properties of inhibiting enzymic activity, said gas containing acetylene and substantial amounts of carbon monoxide, continually bleeding gas from the chamber, and continually whipping the juice to form an intimate mixture between the juice and the gas, thereby causing dissolved oxygen to be dispersed from the juice and the juice to be preserved.

4. In a process for the treatment of fruit juice, characterized by the use of a closed treatment chamber, supplying the juice to the treatment chamber, supplying a gas to the chamber substantially devoid of free oxygen and having the properties of inhibiting enzymic activity, said gas containing substantially 8.2% carbon dioxide $CO_2$, 0.1–0.2% acetylene $C_2H_2$, 0.2–0.1% oxygen $O_2$, 3.8% carbon monoxide CO, 2.2% methane $CH_4$ and 85.5% nitrogen $N_2$, continually bleeding gas from the chamber, and continually whipping the juice to form an intimate mixture between the juice and the gas, thereby causing dissolved oxygen to be dispersed from the juice and the juice to be preserved.

MELVILLE E. DUNKLEY.

REFERENCES CITED

The following references are of record in the file of this patent:

UNITED STATES PATENTS

| Number | Name | Date |
|---|---|---|
| 45,765 | Stanton | Jan. 3, 1865 |
| 1,017,144 | Gironcoli | Feb. 13, 1912 |
| 1,250,079 | Bart | Dec. 11, 1917 |
| 1,387,710 | Harrison | Aug. 16, 1921 |
| 1,975,012 | McKinnis | Sept. 25, 1934 |
| 1,996,171 | Pennington | Apr. 2, 1935 |

FOREIGN PATENTS

| Number | Country | Date |
|---|---|---|
| 413,488 | Great Britain | of 1934 |
| 425,903 | Great Britain | of 1935 |
| 106,472 | Australia | of 1939 |